(12) United States Patent
Yu et al.

(10) Patent No.: US 8,355,217 B2
(45) Date of Patent: Jan. 15, 2013

(54) ALIGNING STRUCTURE FOR OPTICAL ACTUATOR

(75) Inventors: Ching-Hsiang Yu, Taoyuan Hsien (TW); Chia-Chi Wu, Taoyuan Hsien (TW); Fu-Mei Hsu, Taoyuan Hsien (TW); Li-Ming Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 988 days.

(21) Appl. No.: 12/027,846

(22) Filed: Feb. 7, 2008

(65) Prior Publication Data
US 2009/0001237 A1  Jan. 1, 2009

(30) Foreign Application Priority Data

Jun. 29, 2007  (TW) ................................ 96123697 A

(51) Int. Cl.
*G02B 7/02* (2006.01)
(52) U.S. Cl. ...................................................... 359/819
(58) Field of Classification Search .................. 359/811, 359/819, 829
See application file for complete search history.

(56) References Cited

U.S. PATENT DOCUMENTS

| 4,408,830 | A  | * | 10/1983 | Wutherich | .................... | 359/819 |
| 2007/0206297 | A1 | * | 9/2007 | Weber et al. | .................. | 359/819 |

* cited by examiner

*Primary Examiner* — Alicia M Harrington
(74) *Attorney, Agent, or Firm* — Birch, Stewart, Kolasch & Birch, LLP

(57) ABSTRACT

An aligning structure for an optical actuator is disclosed. The optical actuator includes a main structure, a base and an optical element disposed on the base. The aligning structure includes a bracket and an adjusting element. The bracket has a first extending portion disposed corresponding to a second extending portion of the main structure. The adjusting element connects to the first extending portion and the second extending portion and is capable of adjusting the position of the second extending portion relative to the first extending portion.

12 Claims, 4 Drawing Sheets

ALIGNING STRUCTURE FOR OPTICAL ACTUATOR

CROSS REFERENCE TO RELATED APPLICATIONS

This Non-provisional application claims priority under 35 U.S.C. §119(a) on Patent Application No(s). 096123697 filed in Taiwan, Republic of China on Jun. 29, 2007, the entire contents of which are hereby incorporated by reference.

BACKGROUND OF THE INVENTION

1. Field of Invention

The invention relates to an optical mechanism and in particular, to an optical actuator.

2. Related Art

In the present projecting systems, the digital light processing (DLP) projector has the advantages of high brightness, better color appearance, fast response time and no noise. Thus, the DLP projector has been wildly used in theatre, office and family. In order to obtain better images smoothness, the DLP projector has an image smoothing device with an optical actuator fixed at a position on the light path. Therefore, the aligning structure for the optical actuator can critically affect the image quality of the DLP projector.

FIG. 1 shows a conventional aligning structure 13 for an optical actuator 1. The optical actuator 1 includes a main structure 10, a base 11 and an optical element 12. The optical element 12 is a lens or a reflective mirror and is disposed on the base 11, which is connected to the main structure 10. The aligning structure 13 includes a bracket 14 and an adjusting element 15. The main structure 10 is disposed inside the bracket 14. The plate 101 of the main structure 10 has a connecting member 102, which is fixed to the bracket 14. The adjusting element 15 has an elastic member 151 and a locking member 152. The elastic member 151 is a spring, which is not rigid and telescoped to the locking member 152. The locking member 152 is a screw or a bolt.

After the optical actuator 1 is connected with a lens set of the projector (not shown), the adjusting element 15 adjusts the optical element 12 to retrieve an aligning position according to the imaging result. Then, a glue G is applied to fix the connecting member 102. As the result, the optical element 12 can function normally during the oscillation. However, the aligning structure 13 for the optical actuator 1 must be fixed by other glue or assistant objects after the adjustment.

FIG. 2 shows another conventional aligning structure 23 for the optical actuator 2. As shown in FIG. 2, the optical actuator 2 includes a main structure 20, a base 21 and an optical element 22. The optical element 22 is disposed on the base 21, and the base 21 is connected to the main structure 20. The aligning structure 23 includes a bracket 24 and an adjusting element 25. The main structure 20 has a first plate 201 and a second plate 202. The adjusting element 25 has an elastic member 251 and a locking member 252. The first plate 201 is fastened to the bracket 24 by screws S and the adjusting element 25 is connected to the first plate 201. The elastic member 251 is sandwiched between the first plate 201 and second plate 202. The elastic member 251 is a plate with higher rigidity. The locking member 252 is disposed on the bottom of the bracket 24 and pushes against the second plate 202.

In the adjusting procedure, the locking member 252 is adjusted to push against the second plate 202. Thus, the optical element 22 can be adjusted to align with a datum plane P of the bracket 24 so as to finish the adjusting procedure of the optical actuator 2.

However, the elastic member 251, which has higher rigidness, is disposed between the first plate 201 and second plate 202, and the second plate 202 can only be adjusted upwardly, so that utilizing the locking member 252 to push against the second plate 202 is hard to precisely align the optical actuator 2.

Therefore, it is an important subject to provide an aligning structure for an optical actuator that can simplify the aligning procedure for the optical element, enhance the reliability of the aligning structure and simplify the structure of the optical actuator.

SUMMARY OF THE INVENTION

In view of the foregoing, the invention is to provide an aligning structure for an optical actuator that can simplify the adjusting mechanism and aligning procedure for the optical element by changing and simplifying the structure of the optical actuator so as to decrease the manufacturing cost thereof.

To achieve the above, the invention discloses an aligning structure for an optical actuator. The optical actuator includes a main structure, a base connecting to the main structure and an optical element disposed on the base. The aligning structure includes a bracket and an adjusting element. The bracket has a first extending portion disposed corresponding to a second extending portion of the main structure so that the main structure is fixed to the bracket. The adjusting element connects with the first and second extending portions for adjusting a position of the second extending portion relative to the first extending portion.

To achieve the above, the invention also discloses an aligning structure for an optical actuator. The optical actuator includes a base and an optical element disposed on the base. The aligning structure includes a bracket and an adjusting element. The bracket includes a frame, and the base is fixed to the bracket. The adjusting element is disposed on the frame for aligning the optical element.

As mentioned above, by connecting the adjusting element and bracket to the corresponding extending portions or disposing the adjusting element on the frame, the aligning structure for the optical actuator of the invention can precisely aligning the optical element. Compared with the related art, the additional assistant object for the aligning structure is not needed after the adjusting procedure, and the optical element can be easily adjusted toward various directions. In addition, the aligning structure with the adjusting element of the invention can simultaneously assemble the optical actuator and align the optical element. As the result, the manufacturing cost of the optical actuator can be decreased and the structure thereof can be simplified.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
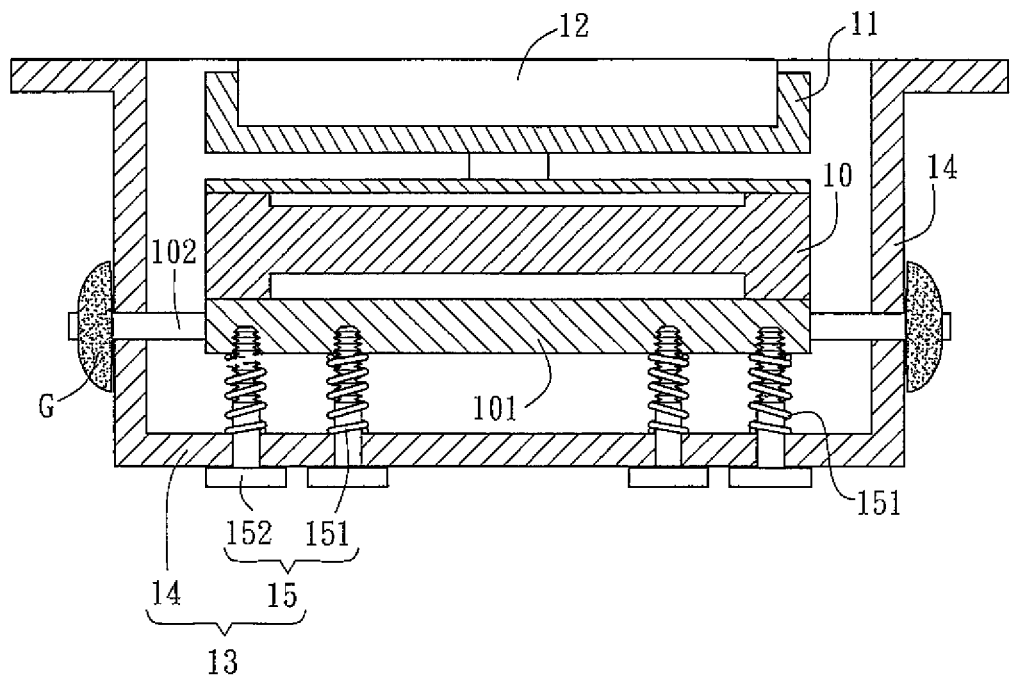
FIG. 1 is a cross-sectional view of a conventional aligning structure for an optical actuator.
Figure 2:
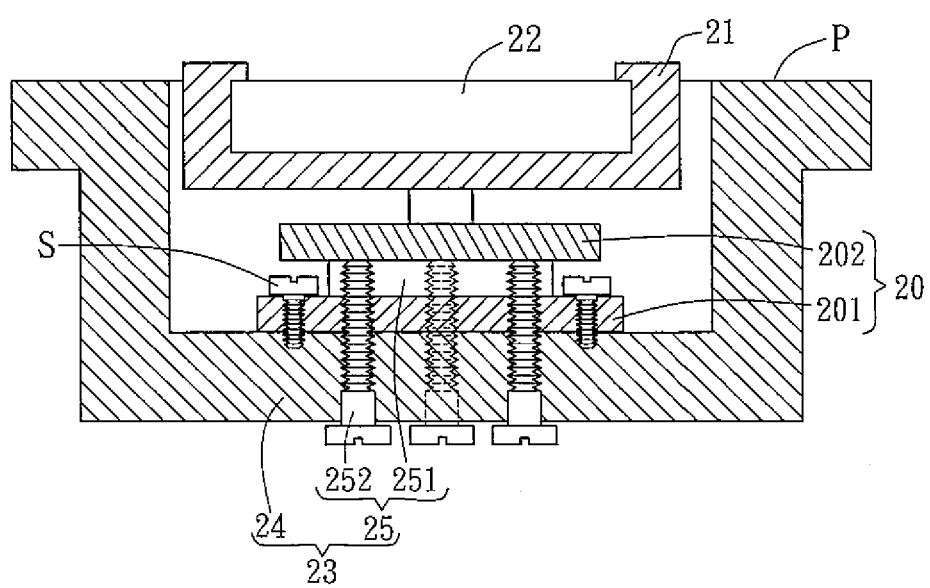
FIG. 2 is a cross-sectional view of another conventional aligning structure for an optical actuator.
Figure 3:
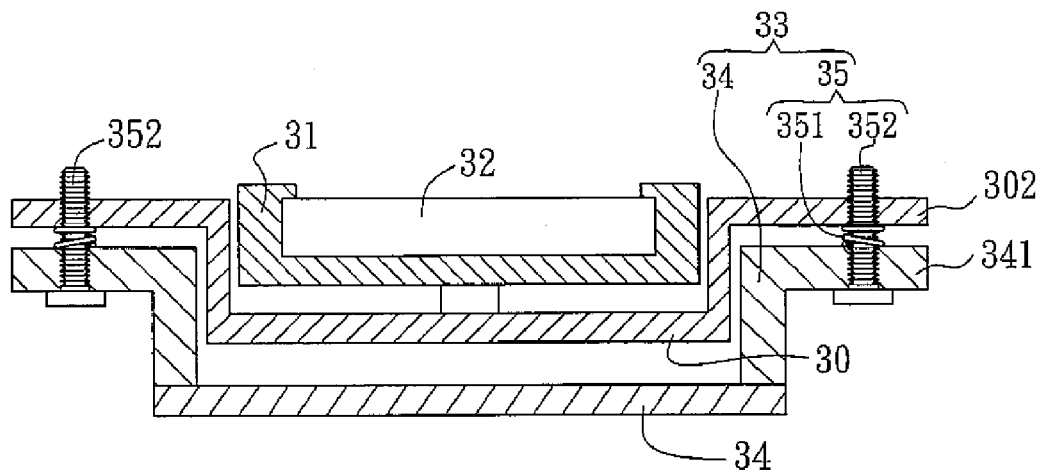
FIG. 3 is a cross-sectional view showing an aligning structure for an optical actuator according to a first embodiment of the invention.
Figure 4:
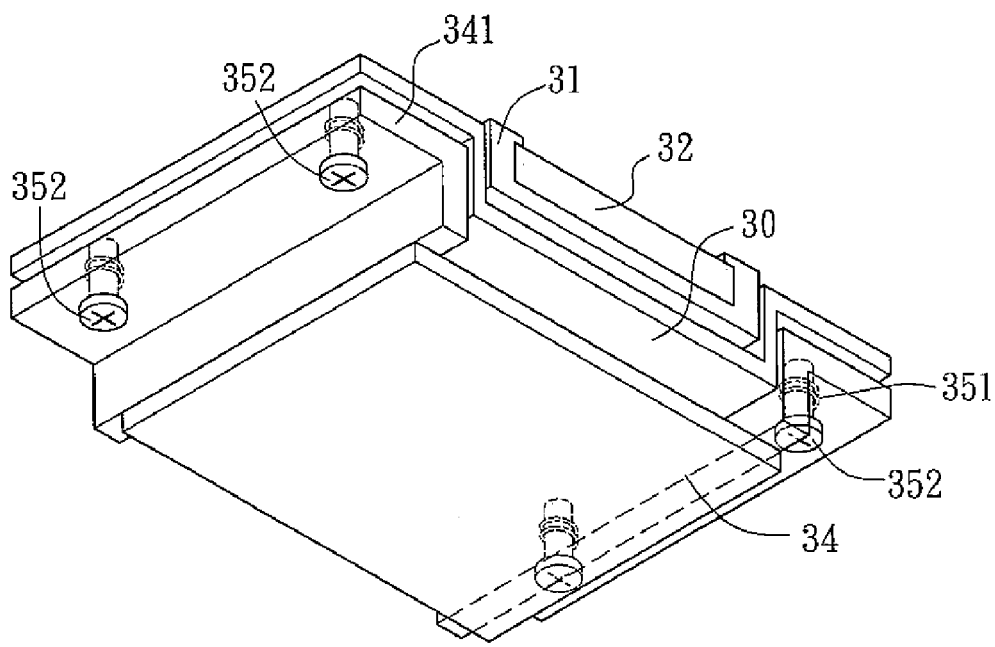
FIG. 4 is rear schematic view showing the first embodiment of the invention.

FIGS. 3 and 4 show an aligning structure 33 for an optical actuator 3 according to a first embodiment of the invention. With reference to FIGS. 3 and 4, the optical actuator 3 includes a main structure 30, a base 31 and an optical element 32. The optical element 32 is, for example, a lens or a reflective mirror, and is disposed on the base 31. The base 31 is connected to the main structure 30. The aligning structure 33 includes a bracket 34 and an adjusting element 35.

The bracket 34 has a first extending portion 341 disposed at the edge of the bracket 34. The first extending portion 341 and the bracket 34 are integrally formed as a monolithic piece. The main structure 30 has a second extending portion 302 disposed at the edge of the main structure 30 corresponding to the first extending portion 341. The second extending portion 302 and the main structure 30 are integrally formed as a monolithic piece. The adjusting element 35 is connected with the first extending portion 341 and the second extending portion 302. The adjusting element 35 has an elastic member 351 and a locking member 352. In the embodiment, the elastic member 351 is a spring or an elastic slice with high rigidity. The elastic member 351 is telescoped to the locking member 352 such as a screw or a bolt.

After the optical actuator 3 is connected with a lens set (not shown), as shown in FIG. 4, the four elastic members 351 and locking members 352 can be adjusted according to the imaging effect.

Figure 5:
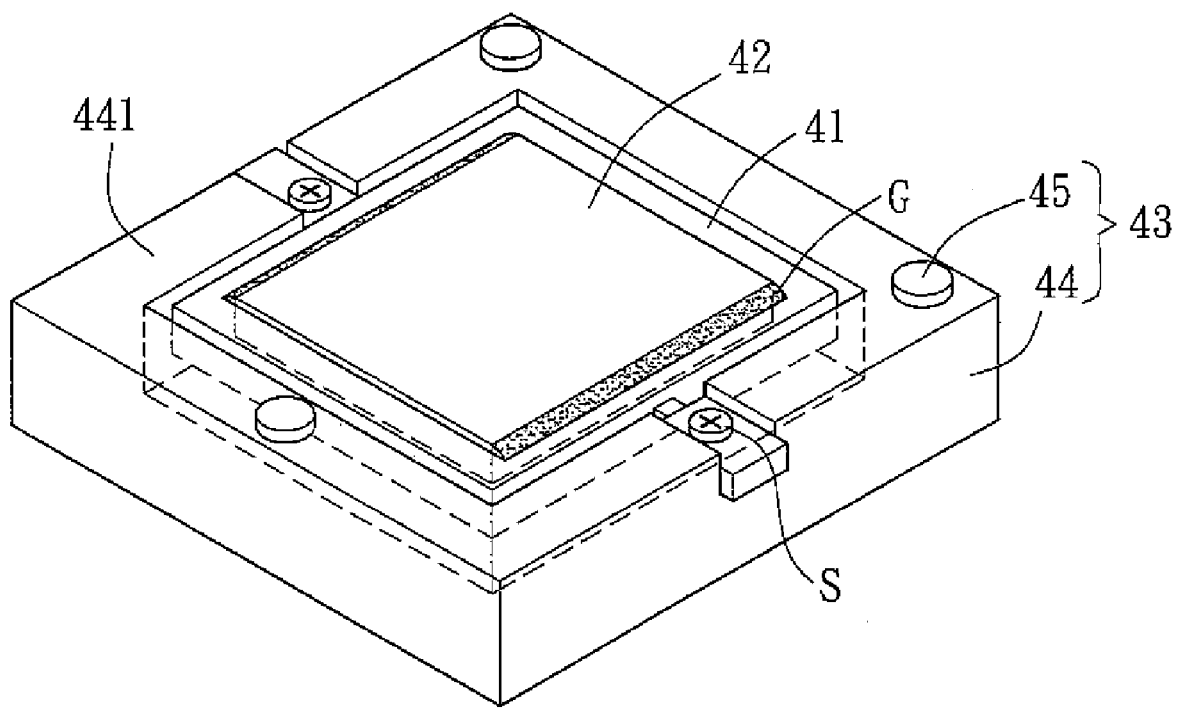
FIG. 5 is a schematic view showing an aligning structure for an optical actuator according to a second embodiment of the invention.

FIG. 5 shows another optical actuator 4 according to a second embodiment of the invention. With reference to FIG. 5, the optical actuator 4 includes a base 41, an optical element 42 and an aligning structure 43. The optical element 42 is, for example, a lens or a reflective mirror, and is disposed on the base 41 by adhering, wedging or buckling. The aligning structure 43 includes a bracket 44 and an adjusting element 45. The bracket 44 has a frame 441, and the base 41 is fixed to the frame 441 by, for example, screws S. The adjusting element 45 is bulk-shaped or plate-shaped and is connected with the frame 441 by, for example but not limited to, adhering, wedging or bucking. In the embodiment, the bracket 44 and the base 41 can be integrally formed as a monolithic piece.

In the second embodiment, the optical element 42 is aligned with the adjusting element 45, and then a glue G is applied to fix the optical element 42 on the base 41. Accordingly, the alignment of the optical element 42 and the assembling of the optical actuator 4 can be finished simultaneously. That is, the aligning procedure of the optical element 42 can finished without additional adjusting mechanism.

Figure 6:
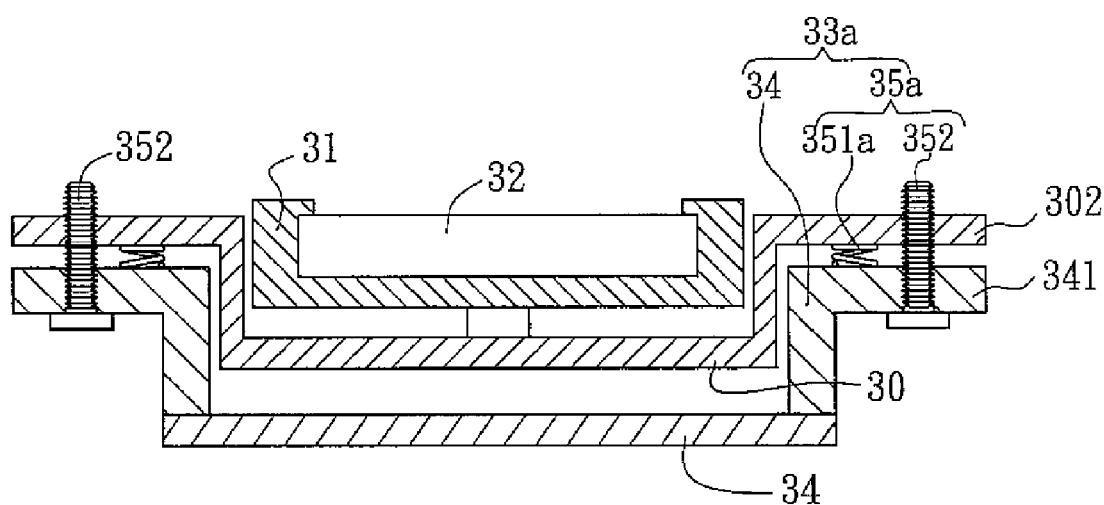
FIG. 6 is a cross-sectional view showing an aligning structure for an optical actuator according to a third embodiment of the invention.

FIG. 6 shows an aligning structure 33a for an optical actuator 3a according to a third embodiment of the invention. In the third embodiment as shown in FIG. 6, elements that are in common with the first embodiment are assigned the same reference numerals, and will not be explicitly described herein, the description that follows being limited to the differences in the third embodiment with respect to the first embodiment.

Specially, the adjusting element 35a includes an elastic member 351a and a locking member 352, and the elastic member 351a does not telescope to the locking member 352. The elastic member 351a is a spring or an elastic slice with high rigidity to achieve adjusting mechanism.

In summary, by connecting the adjusting element and bracket to the corresponding extending portions or disposing the adjusting element on the flame, the aligning structure for the optical actuator of the invention can precisely aligning the optical element. Compared with the related art, the additional assistant object for the aligning structure is not needed after the adjusting procedure, and the optical element can be easily adjusted toward various directions. In addition, the aligning structure with the adjusting element of the invention can simultaneously assemble the optical actuator and align the optical element. As the result, the manufacturing cost of the optical element can be decreased and the structure of the optical actuator can be simplified.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An aligning structure for an optical actuator, wherein the optical actuator comprises a main structure, a base connecting to the main structure and an optical element disposed on the base, the aligning structure comprising:

a bracket having a bottom portion, two first side walls and two first extending portions disposed corresponding to two second extending portions of the main structure so that the main structure is fixed to the bracket, wherein the first side walls are formed on two ends of the bottom portion respectively, each first side wall extends upward from the end of the bottom portion and has a bend, the first extending portions extend outward from the bends of the first side walls respectively, wherein the main structure has a bottom plate, two second side walls and the second extending portions, the second side walls are formed on two ends of the bottom plate respectively, each second side wall extends upward from the end of the bottom plate and has a bend, and the second extending portions extend outward from the bends of the second side walls respectively; and an adjusting element connected with one of the first extending portions and one of the second extending portions for adjusting a position of the one of the second extending portions connected with the adjusting element relative to the one of the first extending portions connected with the adjusting element.

2. The aligning structure of claim 1, wherein the first extending portion is positioned at an edge of the bracket.

3. The aligning structure of claim 2, wherein the first extending portion and the bracket are integrally formed as a monolithic piece.

4. The aligning structure of claim 2, wherein the second extending portion is positioned at an edge of the main structure.

5. The aligning structure of claim 4, wherein the second extending portion and the main structure are integrally formed as a monolithic piece.

6. The aligning structure of claim 1, wherein the adjusting element has a locking member and an elastic member telescoped to the locking member.

7. The aligning structure of claim 6, wherein the elastic member is a spring or an elastic slice.

8. The aligning structure of claim 6, wherein the elastic member is highly rigid.

9. The aligning structure of claim 6, wherein the locking member is a screw or a bolt.

10. The aligning structure of claim 1, wherein the main structure is fixed to the bracket by locking.

11. The aligning structure of claim 1, wherein the optical element is disposed on the base by adhering, wedging or buckling.

12. The aligning structure of claim 1, wherein the optical element is a lens or a reflective mirror.

* * * * *